United States Patent
Kim et al.

(10) Patent No.: US 9,594,525 B2
(45) Date of Patent: Mar. 14, 2017

(54) DATA STORAGE DEVICE AND OPERATING METHOD THEREOF

(71) Applicant: SK hynix Inc., Icheon-si, Gyeonggi-do (KR)

(72) Inventors: Dong-Gun Kim, Hwaseong-si (KR); Yong-Kee Kwon, Icheon-si (KR); Hong-Sik Kim, Seongnam-si (KR)

(73) Assignee: SK Hynix Inc., Gyeonggi-do (KR)

( * ) Notice: Subject to any disclaimer, the term of this patent is extended or adjusted under 35 U.S.C. 154(b) by 10 days.

(21) Appl. No.: 14/505,042

(22) Filed: Oct. 2, 2014

(65) Prior Publication Data

US 2015/0134876 A1   May 14, 2015

(30) Foreign Application Priority Data

Nov. 11, 2013   (KR) .................. 10-2013-0135986

(51) Int. Cl.
*G06F 15/17* (2006.01)
*G06F 3/038* (2013.01)
*G06F 13/20* (2006.01)
*G06F 3/06* (2006.01)
*G06F 12/02* (2006.01)

(52) U.S. Cl.
CPC ............ *G06F 3/0679* (2013.01); *G06F 3/061* (2013.01); *G06F 3/0652* (2013.01); *G06F 12/0246* (2013.01); *G06F 2212/1024* (2013.01); *G06F 2212/7205* (2013.01); *G06F 2212/7208* (2013.01)

(58) Field of Classification Search
CPC ............ G06F 12/0246; G06F 3/0688; G06F 12/0253; G06F 2212/2022; G06F 13/4022; G06F 1/266; G06F 1/3275; G06F 21/83; G06F 21/84; G06F 3/02; G06F 3/167; G06F 9/30101; G06F 9/3867; G06F 9/467; G06F 13/42; G06F 13/20; G06F 13/4027; G06F 12/0868; G06F 2212/1024; G06F 3/0635; G06F 13/161; G06F 2213/0064; G11C 11/4093; G11C 11/4096

See application file for complete search history.

(56) References Cited

U.S. PATENT DOCUMENTS

2007/0220514 A1* 9/2007 Sugimoto ............... G06F 3/061
                                                              718/100
2009/0132761 A1* 5/2009 Yim ...................... G06F 3/0613
                                                              711/114

FOREIGN PATENT DOCUMENTS

KR    10-2010-0037789 A    4/2010

* cited by examiner

*Primary Examiner* — David X Yi
*Assistant Examiner* — Candice Rankin
(74) *Attorney, Agent, or Firm* — William Park & Associates Ltd.

(57) ABSTRACT

A data storage device may include: a data storage unit comprising a plurality of channels each having a plurality of nonvolatile memory devices; and a control unit configured to control a garbage collection operation of selecting a first block included in a first channel as a victim block and copying first data included in the first block into a second block included in a second channel that is selected.

12 Claims, 11 Drawing Sheets

CH 0    CHC 0 = 7
CH 1    CHC 1 = 1
CH 2    CHC 2 = 0
CH 3    CHC 3 = 6
        CHC TH = 3

DATA STORAGE DEVICE AND OPERATING METHOD THEREOF

CROSS-REFERENCE TO RELATED APPLICATIONS

The present application claims priority of Korean Patent Application No. 10-2013-0135986, filed on Nov. 11, 2013, which is incorporated herein by reference in its entirety.

BACKGROUND

1. Field

Various embodiments of the invention relate to a data storage device and an operating method thereof, and more particularly, to a data storage device capable of improving the efficiency of garbage collection which is performed in the data storage device, and an operating method thereof.

2. Description of the Related Art

A data storage device such as SSD (Solid State Disk), which includes a nonvolatile semiconductor memory device such as a NAND flash memory device therein, performs a garbage collection operation for securing a free block by eliminating invalid pages.

If garbage collection operation is performed for each channel, and an access for another read/write operation is not allowed for the channel where the garbage collection is being performed. Thus, the efficiency of the conventional data storage device may be degraded.

SUMMARY

In an embodiment, a data storage device may include a data storage unit comprising a plurality of channels each having a plurality of nonvolatile memory devices. The data storage device may also include a control unit configured to control a garbage collection operation of selecting a first block included in a first channel as a victim block and copying first data included in the first block into a second block included in a second channel that is selected.

In an embodiment, there is provided an operating method of a data storage device which includes a plurality of channels each having a plurality of nonvolatile memory devices. The operating method may include: selecting a first block included in a first channel as a victim block; selecting a second channel among the plurality of channels; and copying first data included in the victim block into a second block included in the second channel.

In an embodiment, a data storage device may include a data storage unit including a plurality of channels and a plurality of nonvolatile memory devices. The data storage device may also include a register configured to store information on one of the plurality of channels on which garbage collection is performed and store identification information of an other channel of the plurality of channels into which valid pages are copied.

DETAILED DESCRIPTION

Various embodiments will be described below in more detail with reference to accompanying drawings. The invention may, however, be embodied in different forms and should not be construed as limited to the embodiments set forth. Rather, these embodiments are provided so that this disclosure will be thorough and complete, and fully convey the scope of the invention to those skilled in the art. Throughout the disclosure, like reference numerals refer to like parts throughout the various figures and embodiments of the invention. Various embodiments are directed to a data storage device capable of improving operation efficiency by distributing garbage collection to a plurality of channels in the data storage device including a plurality of channels, and an operating method.

Figure 1:
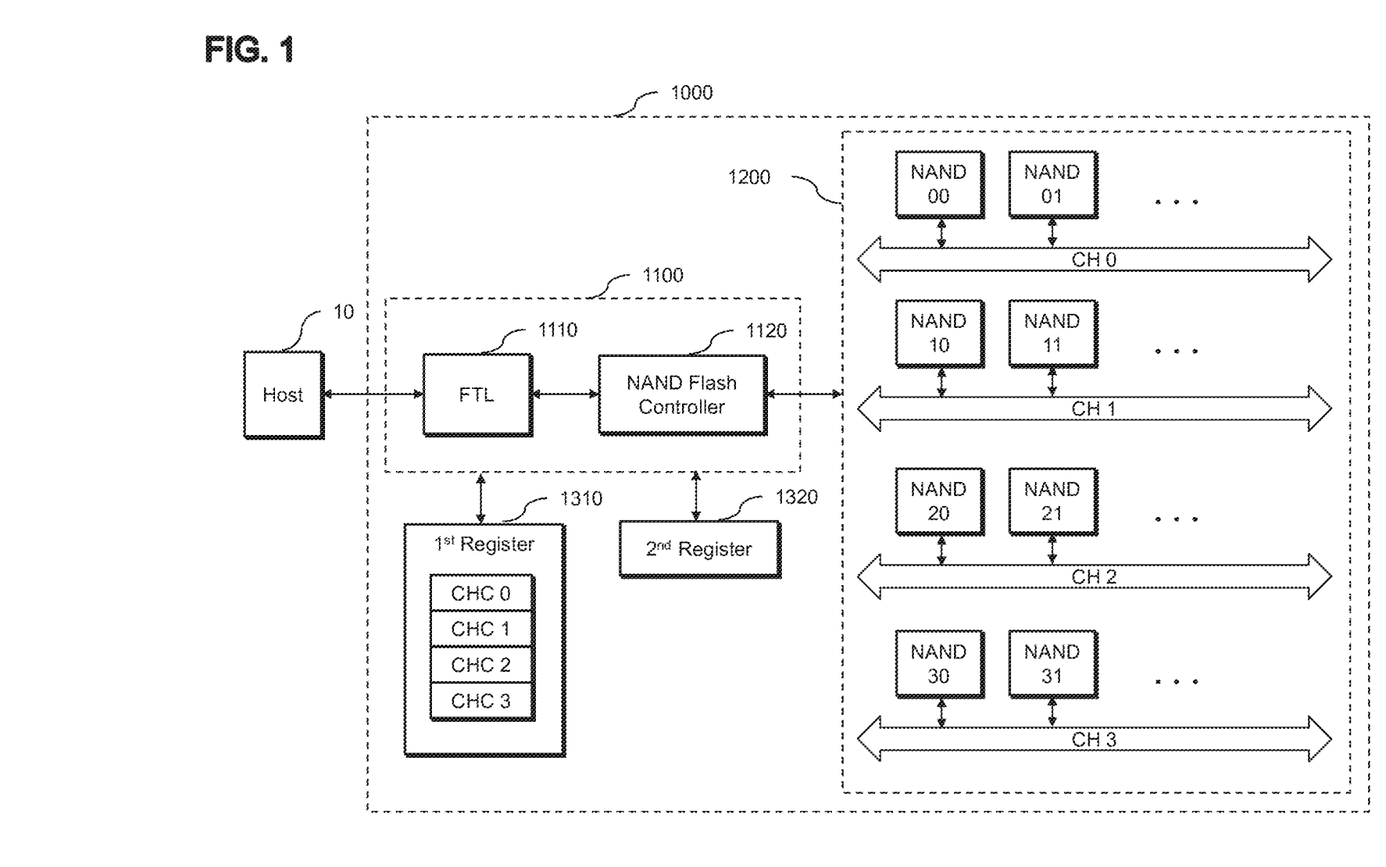
FIG. 1 is a block diagram of a system including a data storage device in accordance with an embodiment of the invention.

Referring to FIG. 1, a block diagram of a system including a data storage device 1000 in accordance with an embodiment of the invention is shown.

The data storage device 1000 may receive a read or write request from a host 10 and store data transmitted from the host 10 or transmit data to the host 10.

The data storage device 1000 in accordance with an embodiment of the invention may include a control unit 1100 configured to process a request from the host 10 and a data storage unit 1200 configured to store data.

In the following descriptions, the data storage unit 1200 includes a NAND flash memory device. However, the data storage unit 1200 may include another kind of nonvolatile memory device in which garbage collection is performed.

The data storage unit 1200 may include a plurality of channels CH0 to CH3, and each of the channels may include a plurality of NAND flash memory devices. The number of channels may differ depending on embodiments.

The control unit 1100 may include an FTL (Flash Translate Layer) 1110 and a NAND flash controller 1120. The FTL 1110 may process a plurality of read/write requests transmitted from the host 10. The NAND flash controller 1120 may generate a signal for read, write, or erase operation for a channel and a NAND flash memory device included in the data storage unit 1200, according to a request selected through the FTL 1110. Since the operations of the FTL 1110 and the NAND flash controller 1120 are publicly known, the detailed descriptions thereof are omitted.

In an embodiment of the invention, the FTL 1110 may not only process read/write requests transmitted from the host 10, but also control a garbage collection operation for the NAND flash memory devices.

As publicly known, a garbage collection operation performed in a NAND flash memory device may be performed in the following order: the NAND flash memory device selects a victim block, copies valid pages included in the victim block into another block, and then erases the victim block.

As described above, the garbage collection operation of the conventional data storage device is performed only in a channel where a victim block is positioned. On the other hand, during the garbage collection operation of the data storage device in accordance with an embodiment of the invention, valid pages included in a victim block may be copied into another channel besides the channel including the victim block.

The channel into which the valid pages are to be copied may be selected by considering whether each channel is idle or the access count for each channel.

The channel into which the valid channels in the victim block are to be copied may be set on the basis of the time at which each of the valid pages is copied or set on the basis of the time at which the garbage collection operation is started. This will be described below in detail.

The access count for each channel may indicate the number of requests from the host to the channel for a predetermined time before garbage collection is performed.

The data storage device 1000 in accordance with an embodiment of the invention may further include a first register 1310 configured to store an access count for each channel. The first register 1310 may include counts fields CHC0 to CHC3 for storing the access counts for the respective channels CH0 to CH3.

The FTL 1110 may reset the values stored in the first register 1310 at each predetermined time or reduce the values at a predetermined ratio or by a predetermined value. Through this operation, the FTL 1110 may reduce the influence of a request which was made by the host a sufficiently long time ago. At this time, the predetermined time, the predetermined ratio, and the predetermined value may be easily changed by those skilled in the art.

The data storage device 1000 in accordance with an embodiment of the invention may further include a second register 1320 configured to store information on the channel used while garbage collection is performed. For example, the second register 1320 may store the identification information of a channel into which valid pages are copied and information on the time at which the valid pages start to be copied. When the second register 1320 stores the identification information of channels in the order in which the channels are used, the information on the time at which each channel is used may not be stored.

Figure 2:
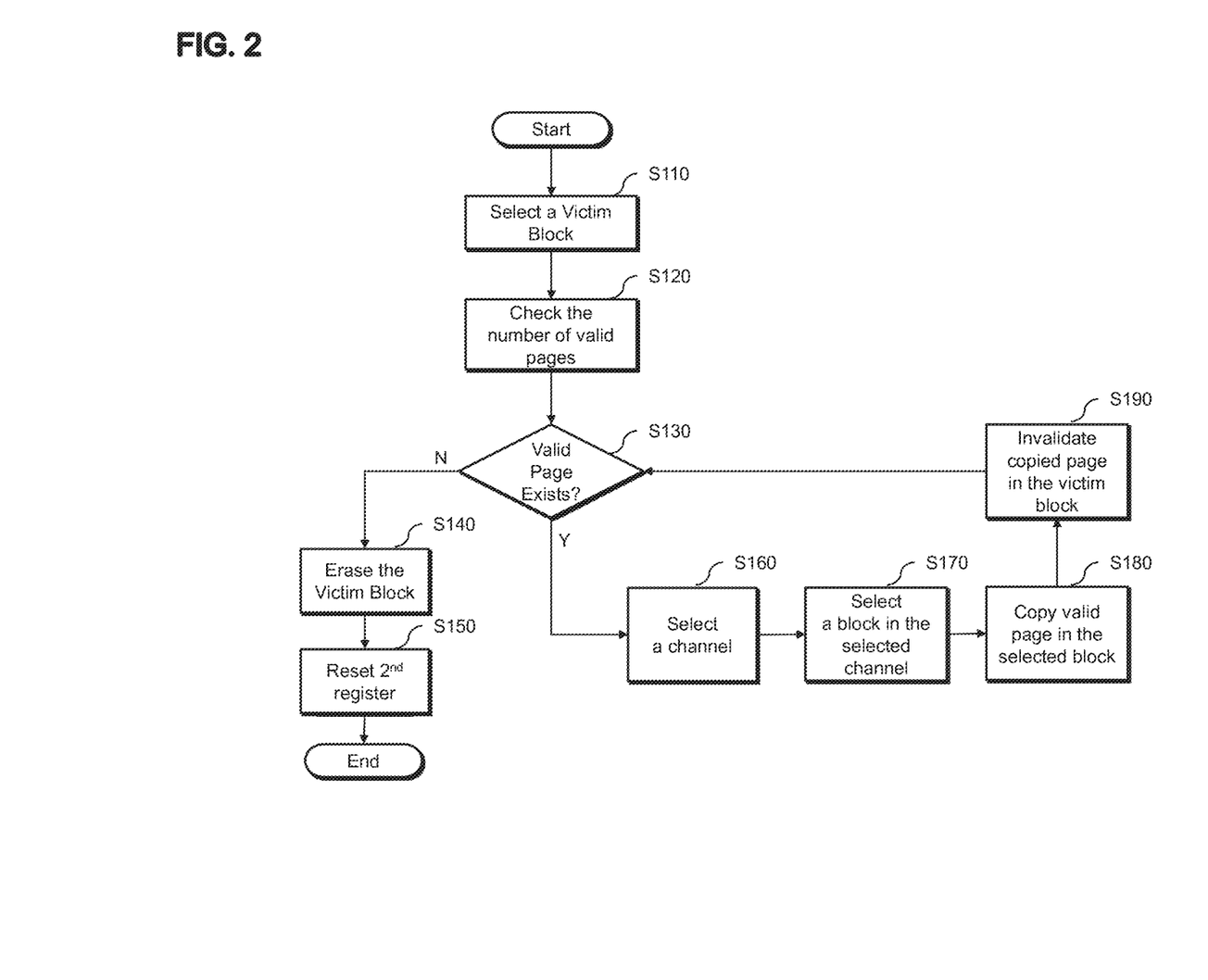
FIGS. 2 to 4 are flowcharts for explaining an operating method of a data storage device in accordance with an embodiment of the invention.

Referring to FIG. 2, a flowchart for explaining the garbage collection operation of the data storage device in accordance with an embodiment of the invention is shown.

First, the data storage device may select a victim block in which garbage collection is to be performed, at step S110. Hereafter, suppose that the victim block is positioned in the first channel CH0, for convenience of description.

The operation of selecting a victim block may be performed in various manners. For example, a block having the smallest proportion of valid pages may be selected as the victim block.

Then, the data storage device 1000 may check the number of valid pages in the victim block at step S120, and determine whether valid pages exist, at step S130.

When no valid pages exist, the data storage device 1000 may erase the victim block at step S140, reset information of the second register 1320 at step S150, and end the garbage collection operation.

When valid pages exist, the data storage device 1000 may select a channel into which the valid pages are to be copied at step S160. The data storage device 1000 may then select a block into which the valid pages are to be copied, in the selected channel at step S170. In addition, the data storage device 1000 may copy the valid pages into the selected block at step S180 and invalidate the copied valid pages in the victim block at step S190.

Then, the data storage device may move to step S130 of checking whether valid pages exist, and repeat the above-described operation.

Figure 3:
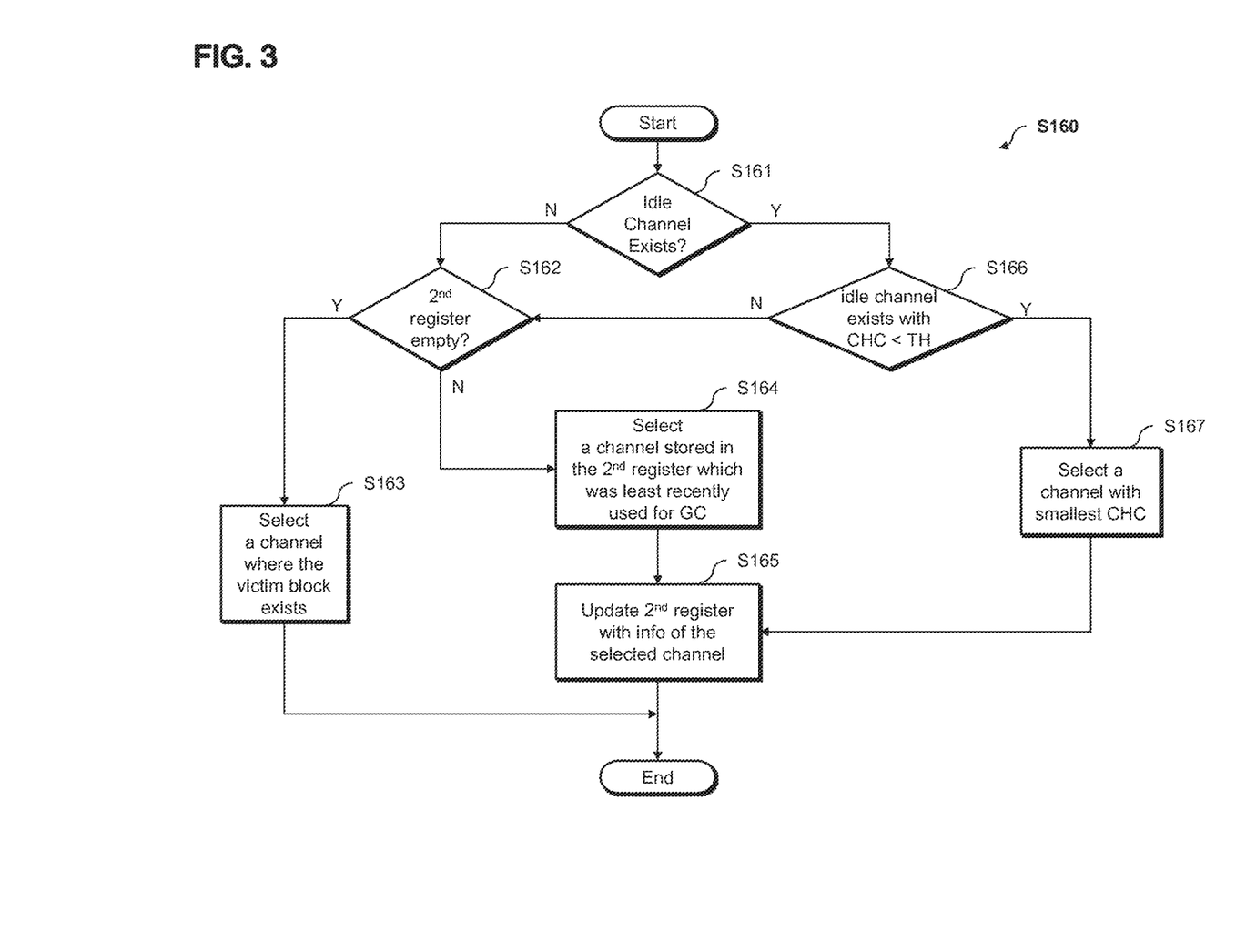

Referring to FIG. 3, a flowchart for explaining step S160 of selecting a channel into which valid pages are to be copied is shown.

First, the data storage device 1000 may check whether idle channels exist at step S161.

When no idle channels exist, the data storage device may check the second register 1320 to determine whether there exist channels in which valid pages are copied, or more specifically, whether the second register 1320 is empty, at step S162.

When the second register 1320 is empty, the data storage device 1000 may select the channel CH0, in which the victim block exists, as a channel into which valid pages are to be copied, at step S163 and then end the operation.

When the second register 1320 is not empty, the data storage device may select the channel into which valid pages were copied the longest time ago, among the channels stored in the second register 1320, as a channel into which valid pages are to be copied, at step S164.

Then, the data storage device 1000 may update information on the channel selected in the second register 1320 at step 165. For example, the data storage device 1000 may update the time of use of the selected channel or update the storage order of the channel, when the respective pieces of channel information stored in the second register 1320 are arranged in the order in which the channels were used.

When it is determined at step S161 that idle channels exist, the data storage device 1000 may check the values of the first register to determine whether there exists a channel having a channel access count CHC less than a threshold value TH, among the idle channels, at step S166.

When there exist no channels which have a channel access count CHC less than the threshold value TH, the data storage device 1000 may move to step S162 and perform the above-described operation. In an embodiment, when the channel access count CHC is equal to or more than the threshold value, the data storage device may determine that a read or write request is highly likely to be performed on the corresponding channel. In this case, the data storage device 1000 may not select the corresponding channel as the target channel.

When there exists only one channel having a channel access count CHC less than the threshold value among the idle channels, the data storage device 1000 may select the channel. However, when there exist two or more channels, the data storage device 1000 may select one of the channels according to various standards, at step S167. For instance, the data storage device 1000 may select the channel having the smallest channel access count CHC among the channels, or arbitrarily select any one of the channels. In an embodiment, the data storage device 1000 selects the channel having the smallest channel access count CHC.

Then, the data storage device 1000 may update information of the selected channel in the second register 1320 at step S165. At this time, when the information of the selected channel does not exist in the second register 1320, the data storage device 1000 may add the information of the selected channel to the second register 1320.

In an embodiment of FIG. 3, the data storage device 1000 may determine whether there exist idle channels and whether the channel access counts satisfy the predetermined condition, whenever valid pages are copied, and then select a channel.

Figure 4:
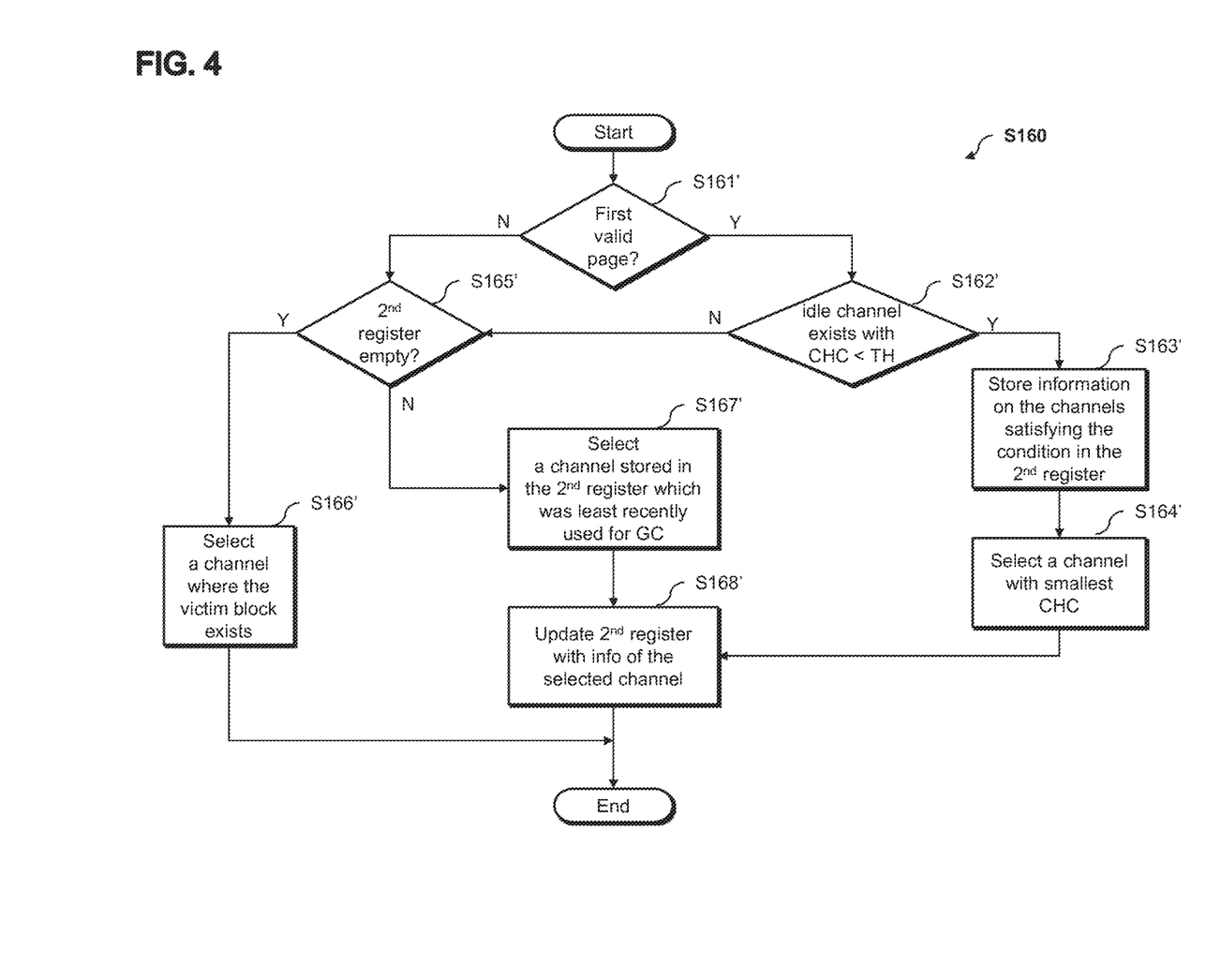

Referring FIG. 4, a flowchart illustrating an embodiment of step S160 of selecting a channel into which valid pages are to be copied is shown.

First, at step S161', the data storage device may check whether a valid page to be copied is the valid page which is first copied after garbage collection is started.

When the valid page is the first valid page, the data storage device may check whether there exist valid channels having a channel access count less than the threshold value at step S162'.

When there exists one channel satisfying the condition or there exist two or more idle channels satisfying the condition, the data storage device 1000 may store information on the idle channels in the second register 1320 at step S163'.

Then, the data storage device 1000 may select one of the stored channels at step S164'. When a plurality of channels are stored, the data storage device 1000 may select the channel having the smallest channel access number CHC. In an embodiment, the data storage device 1000 may select a channel according to another standard.

Then, the data storage device 1000 may update information of the selected channel in the second register 1320, at step S168'. For example, the data storage device 1000 may write information on the time at which the channel was selected or store the storage order of the selected channel according to the order of use.

When it is determined at step S161' that the valid page is not the first valid page, the data storage device 1000 may move to step S165'.

At step S165', the data storage device 1000 may check whether channel information exists in the second register 1320.

When no channel information exists, the data storage device 1000 may select the channel in which the victim block exists at step S166' and end the operation.

When the channel information exists, the data storage device 1000 may select one channel stored in the second register 1320 or one of two or more channels stored in the second register 1320 at step S167'. For instance, when two or more channels are stored in the second register 1320, the data storage device 1000 may select the channel which was used the longest time ago. Then, the data storage device 1000 may update the information of the selected channel in the second register 1320 at step S168'.

When it is checked at step S162' that there exist no channels which satisfy the condition, the data storage device 1000 may move to step S165'. In this case, since no information is stored in the second register 1320, the data storage device 1000 may move to step S166' to select a channel where the victim block exists and end the process.

Referring to FIGS. 5A to 5F, diagrams for explaining the garbage collection operation in accordance with an embodiment of the invention are shown.

FIGS. 5A to 5F are based on the method described with reference to FIG. 3, when selecting a channel into which valid pages are to be copied.

Figure 5A:
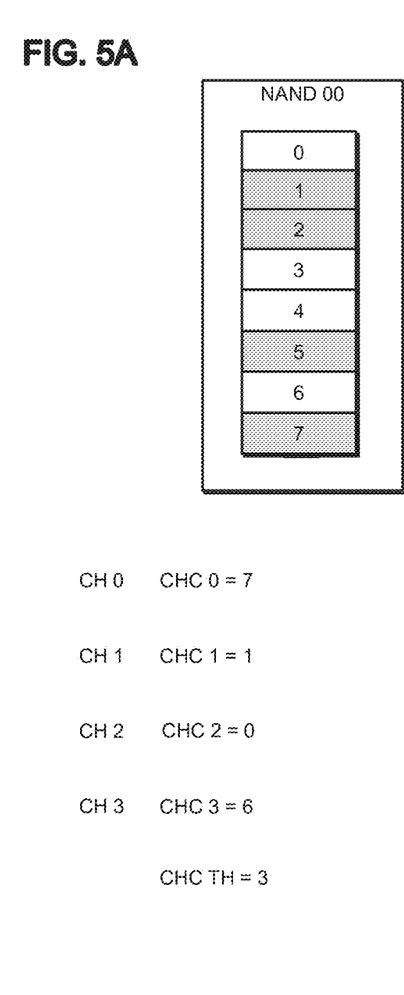
FIGS. 5A to 5F are diagrams for explaining the operation of the data storage device in accordance with an embodiment of the invention.

FIG. 5A illustrates a victim block in a NAND flash memory NAND00 belonging to the first channel CH0. In the victim block, a part indicated by gray color may represent an invalid page, and a part indicated by white color may represent a valid page.

In the current state, the access counts of the respective channels CH0 to CH3 may be set to 7, 1, 0, and 6, and the threshold value for the access counts may be set to 3.

Figure 5B:
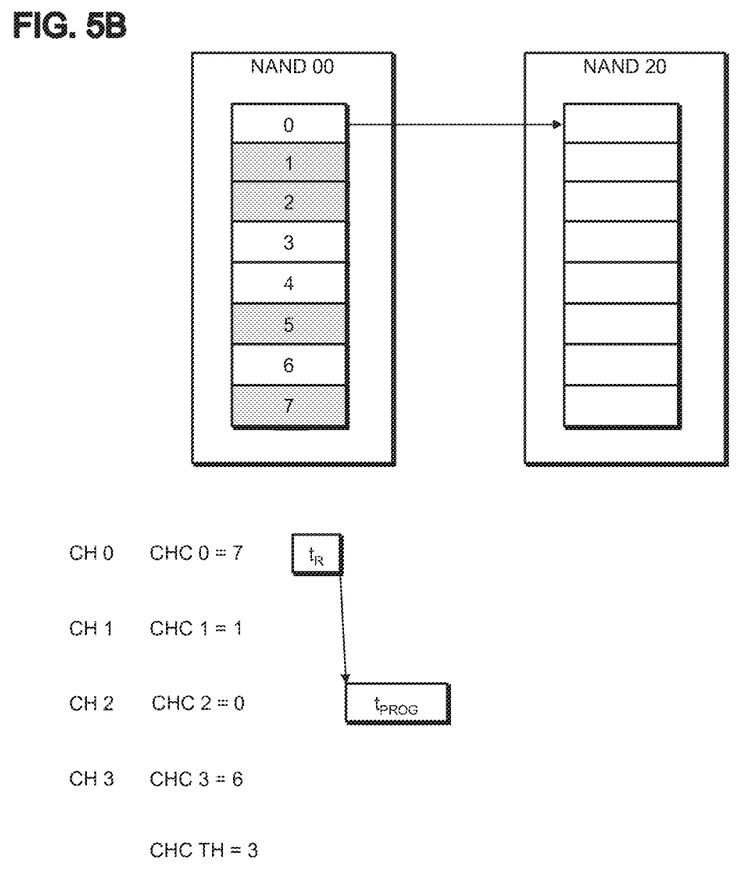

FIG. 5B illustrates an operation of selecting a channel into which the 0th page is to be copied.

Among the plurality of channels, the second channel CH1, the third channel CH2, and the fourth channel CH3 are idle channels. The second and third channels CH1 and CH2 have a smaller channel access count than the threshold value.

The data storage device 1000 may select the third channel CH2 having the smaller channel access count between the second and third channels CH1 and CH2, and copy the 0th page into a block of the selected channel.

Then, the data storage device 1000 may store the information on use of the third channel CH2 into the second register 1320.

Figure 5C:
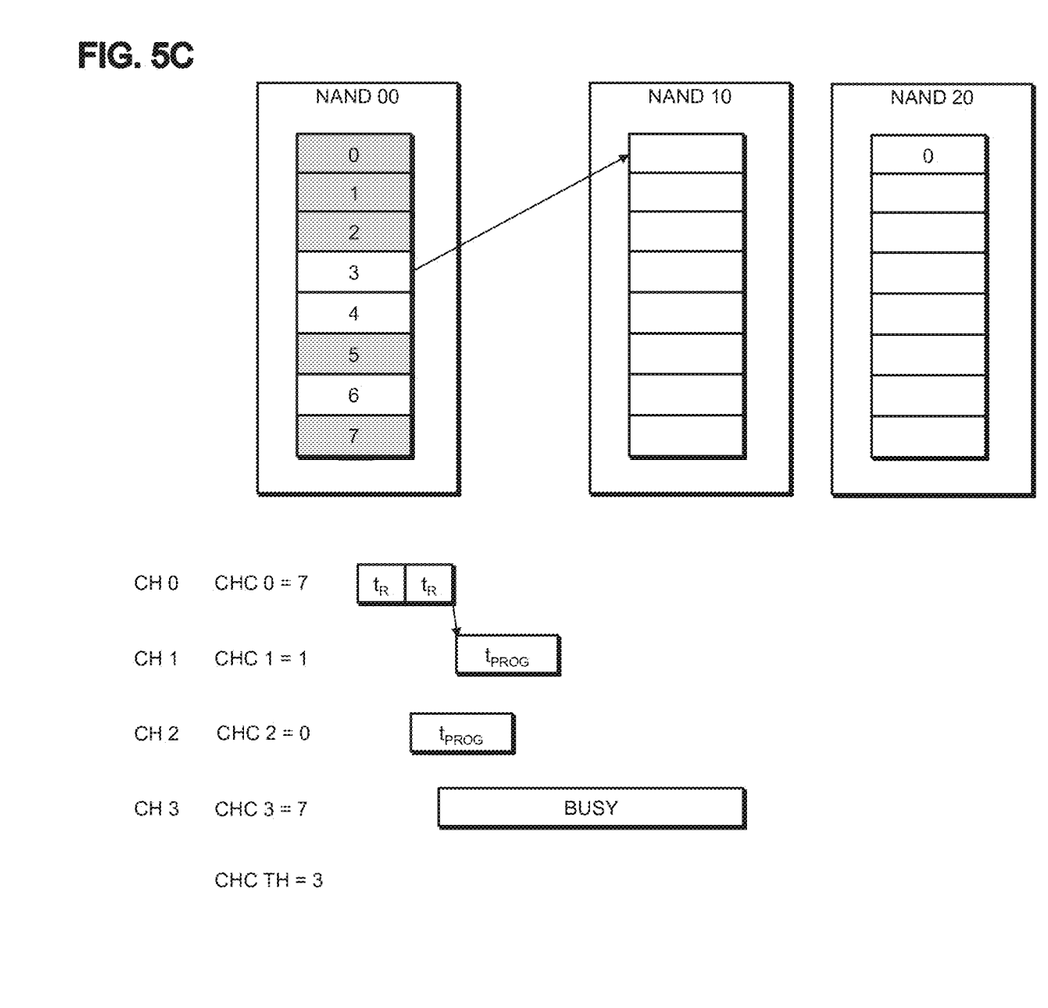

Referring to FIG. 5C, an operation of selecting a channel into which the third page is to be copied is illustrated.

When a read operation for the third page is completed, the third and fourth channels CH2 and CH3 are not idle.

The fourth channel CH3 was changed to a busy state because a read or write request was transmitted from outside while the 0th page was copied into the third channel CH2.

Since the access count for the second channel CH2 is less than the threshold value, the data storage device 1000 may select the second channel CH1 as the channel into which the third page is to be copied.

Then, the data storage device 1000 may store the information on use of the second channel CH2 into the second register 1320.

Figure 5D:
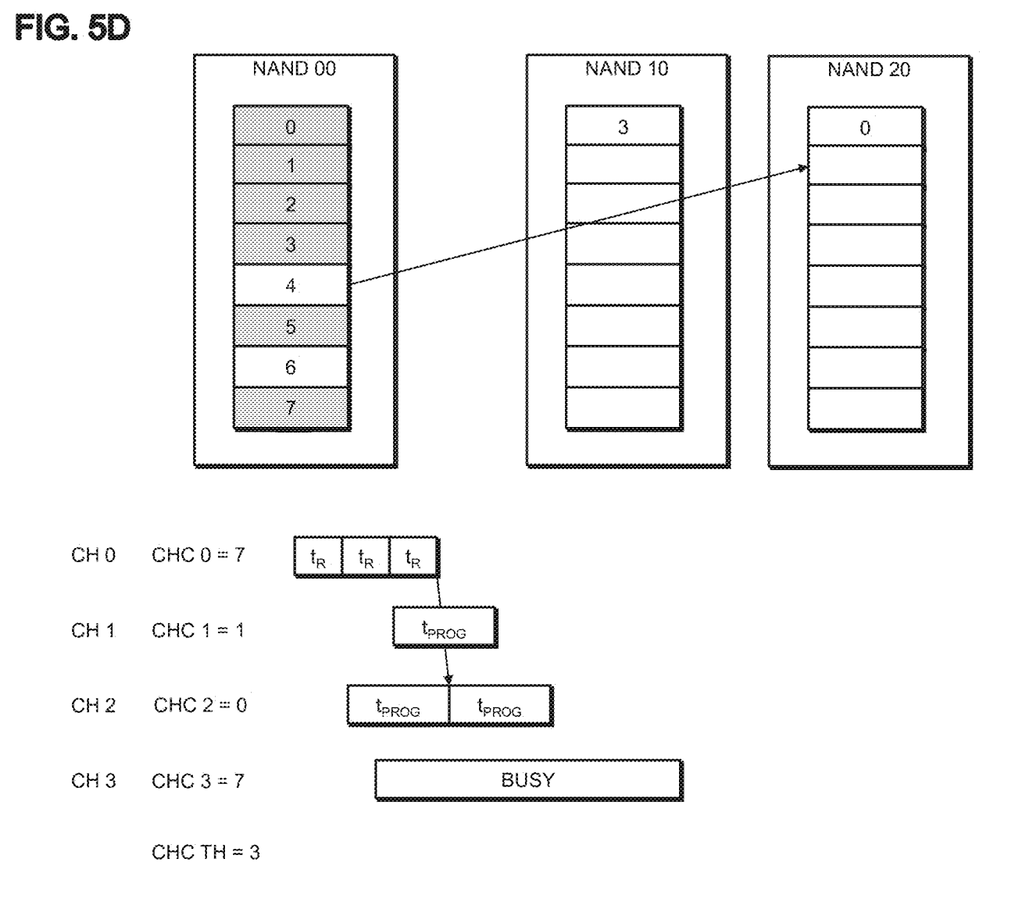

Referring to FIG. 5D, i an operation of selecting a channel into which the fourth page is to be copied is illustrated.

When a read operation for the fourth page is completed, no idle channels exist. Thus, the data storage device 1000 may check whether there exist channels stored in the second register 1320.

At this time, the second register 1320 stores the information on the second and third channels. The data storage device 1000 may select the third channel which was used the longest time ago, between the second and third channels.

Then, the data storage device 1000 may update the information on use of the third channel.

Figure 5E:
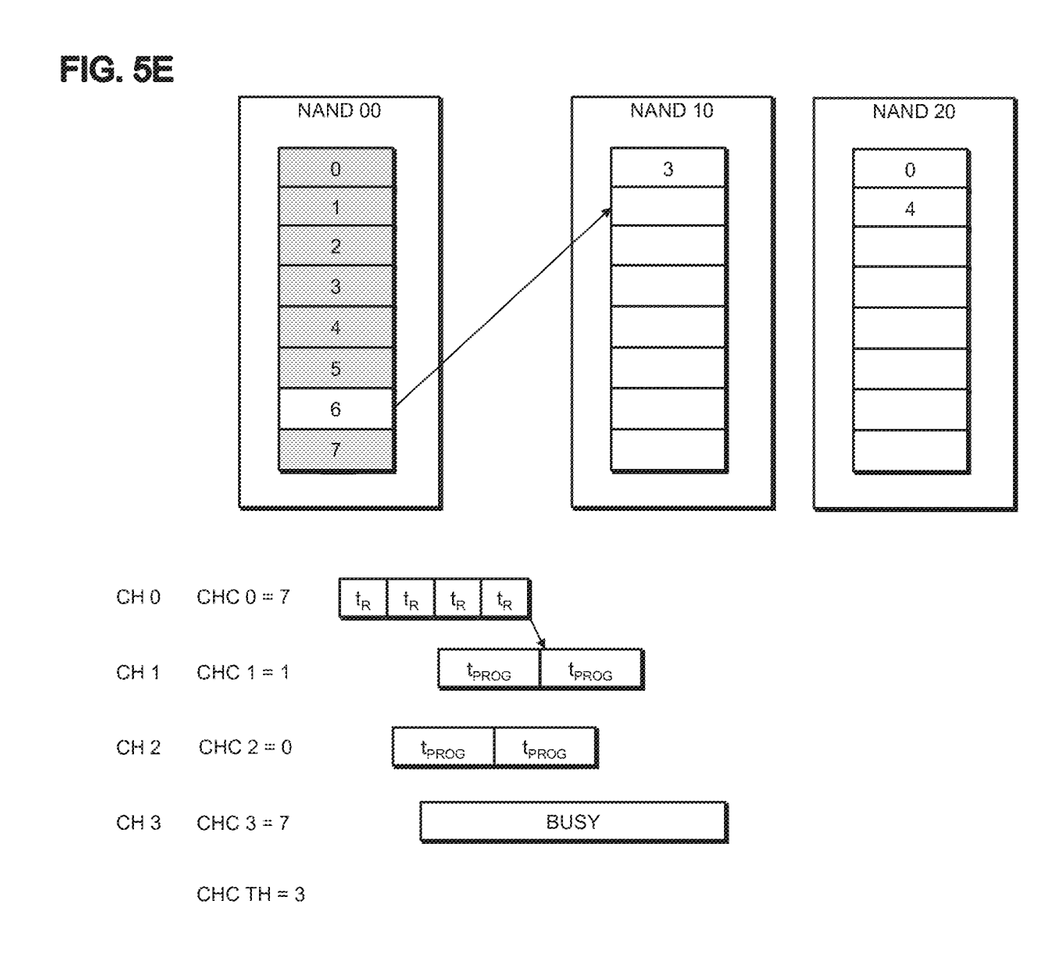

Referring to FIG. 5E, an operation of selecting a channel into which the sixth page is to be copied is illustrated.

When a read operation for the sixth page is completed, no idle channels exist. Thus, the data storage device 1000 may check whether there exist channels stored in the second register 1320.

At this time, the second register 1320 stores the information on the second and third channels. The data storage device 1000 may select the second channel which was used the longest time ago between the second and third channels.

Then, the data storage device 1000 may update the information on use of the second channel.

Figure 5F:
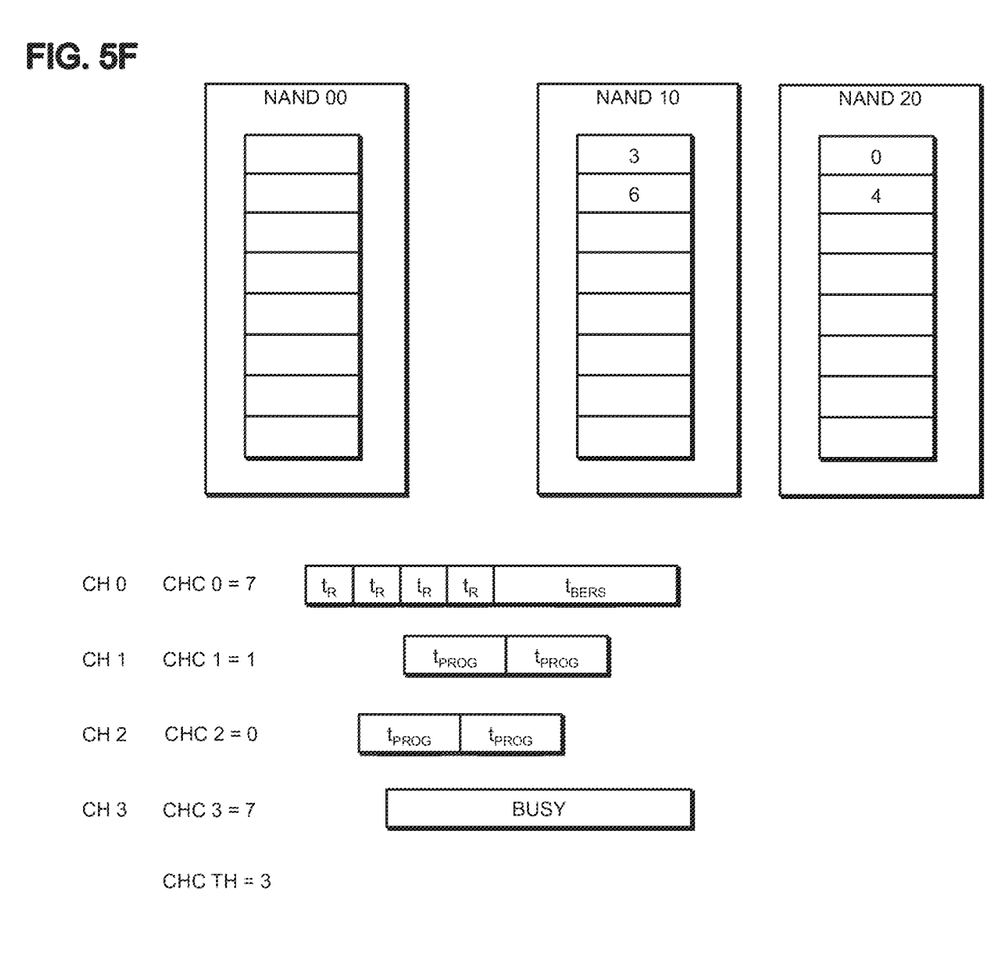

Referring to FIG. 5F, an operation of erasing the victim block after the copying operation for the valid pages in the victim block is ended is illustrated.

In accordance with an embodiment of the invention, the data storage device 1000 may distribute the garbage collection operation to a plurality of channels, thereby preventing the degradation of performance during the garbage collection operation.

Figure 6:
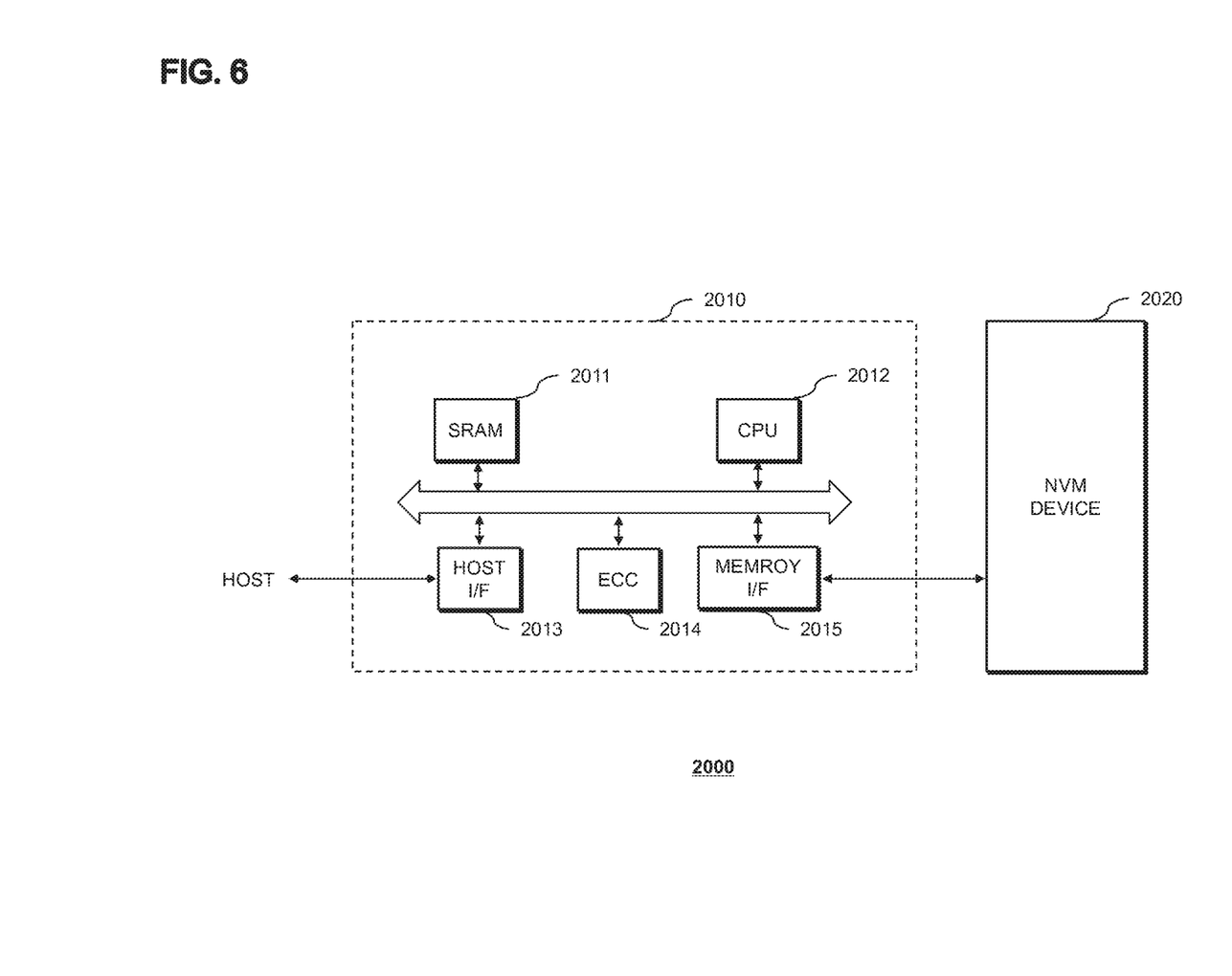
FIG. 6 is a schematic block diagram of a memory system according to an embodiment of the invention.

Referring to FIG. 6, a memory system 2000 may include a non-volatile memory device 2020 and a memory controller 2010. The non-volatile memory device 2020 may be configured to include the above-described data storage device 1000. The memory controller 2010 may be configured to control the non-volatile memory device 2020 in a general operation mode.

SRAM 2011 may function as an operation memory of a processing unit (CPU) 2012. A host interface 2013 may include a data exchange protocol of a host being electrically coupled to the memory system 2000. An error correction code (ECC) block 2014 may detect and correct errors included in a data read from the non-volatile memory device 2020. A memory interface (I/F) 2015 may interface with the non-volatile memory device 2020. The CPU 2012 may perform the general control operation for data exchange of the memory controller 2010.

Although various embodiments have been described for illustrative purposes, it will be apparent to those skilled in the art that various changes and modifications may be made without departing from the spirit and scope of the invention as defined in the following claims.

What is claimed is:

1. A data storage device comprising:
   a data storage unit including a plurality of channels each having a plurality of nonvolatile memory devices;
   a control unit configured to control a garbage collection operation of selecting a first block included in a first channel as a victim block and copying a valid page included in the first block into a second block included in a second channel that is selected; and
   a second register configured to store information of one or more channels each having been selected as the second channel,
   wherein:
   when there exists one or more channels each having an access count equal to or less than a threshold value, the control unit selects a channel having an access count equal to or less than the threshold value, among the plurality of channels, as the second channel;
   when there is no channel with an access count equal to or less than the threshold value among the plurality of channels, the control unit selects the second channel among channels whose information is stored in the second register; and
   wherein:
   when the second register does not contain information on the second channel, the control unit stores information of the second channel in the second register;
   when the second register contains information on the second channel, the control unit updates information of the second channel in the second register.

2. The data storage device of claim 1, wherein the control unit selects a second channel before copying each valid page in the first block.

3. The data storage device of claim 1, wherein the control unit selects an idle channel having an access count equal to or less than the threshold value, among the plurality of channels, as the second channel when there exist one or more idle channels each having an access count equal to or less than the threshold value.

4. The data storage device of claim 1, wherein the control unit selects a channel having the smallest access count as the second channel, when there are two or more channels having an access count equal to or less than the threshold value, among the plurality of channels.

5. The data storage device of claim 1, further comprising:
   a first register configured to store access counts for the plurality of channels,
   wherein the control unit updates access counts for the plurality of channels in response to read or write requests for the respective channels.

6. The data storage device of claim 1, wherein the control unit resets the entire access count related to the plurality of channels at each predetermined time or reduces the entire access count at a predetermined ratio.

7. The data storage device of claim 1, wherein the control unit selects a channel that was least recently used as the second channel, among channels whose information are stored in the second register.

8. An operating method of a data storage device which includes a plurality of channels each having a plurality of nonvolatile memory devices, comprising:
   selecting a first block included in a first channel as a victim block;
   selecting a second channel among the plurality of channels;
   storing information of the second channel in a register when the register does not contain information of the second channel;
   updating information of the second channel in the register when the register contains information of the second channel; and
   copying a valid page included in the first block into a second block included in the second channel,
   wherein the selecting of the second channel comprises:
     selecting a channel having an access count equal to or less than a threshold value as the second channel when there exist one or more channels each having an access count equal to or less than the threshold value;
     selecting any one of channels whose information are stored in the register when there is no channel with an access count equal to or less than the threshold value among the plurality of channels.

9. The operating method of claim 8, wherein the selecting of the second channel comprises:
   selecting an idle channel having an access count equal to or less than the threshold as the second channel when there exists one or more idle channels each having an access count equal to or less than the threshold value.

10. The operating method of claim 8, wherein the selecting of the second channel comprises selecting the channel having the smallest access count as the second channel, when there exist two or more channels with an access count equal to or less than the threshold value among the plurality of channels.

11. The operating method of claim 8, further comprising:
    resetting the entire access count related to the plurality of channels at each predetermined time or reducing the entire access count at a predetermined ratio.

12. The operating method of claim 8, wherein the selecting of the second channel comprises selecting a channel least recently used as the second channel among channels whose information are stored in the register.

* * * * *